US009350540B1

(12) United States Patent
Pizano

(10) Patent No.: US 9,350,540 B1
(45) Date of Patent: *May 24, 2016

(54) SYSTEM AND METHOD OF SECURE ENCRYPTION FOR ELECTRONIC DATA TRANSFER

(71) Applicant: Ceelox Patents, LLC, Overland Park, KS (US)

(72) Inventor: Erix Pizano, Tampa, FL (US)

(73) Assignee: Ceelox Patents, LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,857

(22) Filed: Oct. 19, 2015

Related U.S. Application Data

(63) Continuation of application No. 14/444,713, filed on Jul. 28, 2014, now Pat. No. 9,166,779, which is a continuation of application No. 13/854,659, filed on Apr. 1, 2013, now Pat. No. 8,793,493, which is a continuation of application No. 11/538,867, filed on Oct. 5, 2006, now Pat. No. 8,412,947.

(51) Int. Cl.
*H04L 29/06* (2006.01)
*H04L 9/08* (2006.01)
*H04L 9/32* (2006.01)

(52) U.S. Cl.
CPC ............ *H04L 9/0819* (2013.01); *H04L 9/0816* (2013.01); *H04L 9/321* (2013.01); *H04L 9/3231* (2013.01); *H04L 63/08* (2013.01); *H04L 2209/24* (2013.01); *H04L 2209/42* (2013.01)

(58) Field of Classification Search
USPC ........................................................ 713/179
See application file for complete search history.

(56) References Cited

U.S. PATENT DOCUMENTS 7,243,366 B2 * 7/2007 Medvinsky .......... G06Q 20/367 705/65
7,493,661 B2 * 2/2009 Liu .................... H04L 63/0428 380/259

OTHER PUBLICATIONS

Encryption wars: early battles by Caloyannides, M.A. IEEE Spectrum, Apr. 2000, vol. 37, issue 4, p. 37-43.*
Integrating Single-use Authentication Mechanisms with Kerberos; Neuman et al, http://www.ietf.org/proceedings/42/I-D/draft-ietf-cat-kerberos-passwords-03.txt; Aug. 1998; 11 pages.*

* cited by examiner

*Primary Examiner* — Jason Lee
(74) *Attorney, Agent, or Firm* — Erise IP, P.A.

(57) ABSTRACT

A system for secure transfer of encrypted data involves a sender client, a recipient client, a main server, and a key server. The sender client receives instructions from a first user identifying transfer data and a recipient identifier, creates a key, encodes the transfer data using the key, and communicates the key and the recipient identifier to a server. The server creates a secure package identifier and communicates such to the sender client. The recipient client receives and identifies the secure package identifier and the encoded transfer data, receives from a second user a user identifier, and communicates the user identifier and the secure package identifier to the server. The server communicates the key to the recipient client only if the secure package identifier received from the recipient client matches the secure package identifier created by the server and if the user identifier matches the recipient identifier.

20 Claims, 12 Drawing Sheets

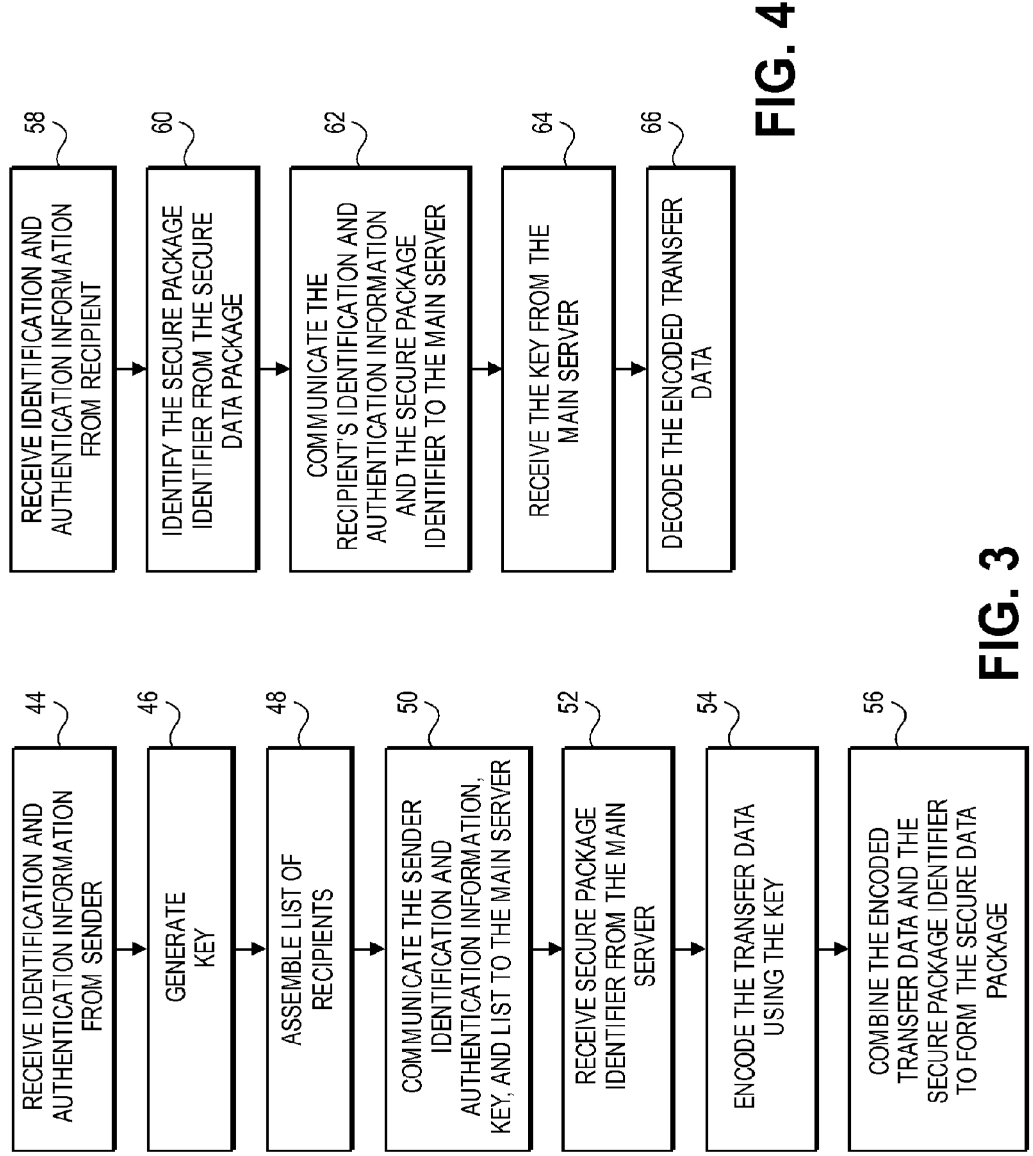
RECEIVE IDENTIFICATION AND AUTHENTICATION INFORMATION FROM RECIPIENT
58
IDENTIFY THE SECURE PACKAGE IDENTIFIER FROM THE SECURE DATA PACKAGE
60
COMMUNICATE THE RECIPIENT'S IDENTIFICATION AND AUTHENTICATION INFORMATION AND THE SECURE PACKAGE IDENTIFIER TO THE MAIN SERVER
62
RECEIVE THE KEY FROM THE MAIN SERVER
64
DECODE THE ENCODED TRANSFER DATA
66
FIG. 4
RECEIVE IDENTIFICATION AND AUTHENTICATION INFORMATION FROM SENDER
44
GENERATE KEY
46
ASSEMBLE LIST OF RECIPIENTS
48
COMMUNICATE THE SENDER IDENTIFICATION AND AUTHENTICATION INFORMATION, KEY, AND LIST TO THE MAIN SERVER
50
RECEIVE SECURE PACKAGE IDENTIFIER FROM THE MAIN SERVER
52
ENCODE THE TRANSFER DATA USING THE KEY
54
COMBINE THE ENCODED TRANSFER DATA AND THE SECURE PACKAGE IDENTIFIER TO FORM THE SECURE DATA PACKAGE
56
FIG. 3

SYSTEM AND METHOD OF SECURE ENCRYPTION FOR ELECTRONIC DATA TRANSFER

RELATED APPLICATIONS

The present application is a continuation application, and claims priority benefit with regard to all common subject matter, of U.S. patent application Ser. No. 14/444,713, filed Jul. 28, 2014, and entitled "SYSTEM AND METHOD OF SECURE ENCRYPTION FOR ELECTRONIC DATA TRANSFER," which is now U.S. Pat. No. 9,166,779, issued Oct. 20, 2015 ("the '779 Patent"). The '779 Patent is a continuation, and claims priority benefit with regard to all common subject matter, of U.S. patent application Ser. No. 13/854,659, filed Apr. 1, 2013, and entitled "SYSTEM AND METHOD OF SECURE ENCRYPTION FOR ELECTRONIC DATA TRANSFER," which is now U.S. Pat. No. 8,793,493, issued Jul. 29, 2014 ("the '493 Patent"). The '493 Patent is a continuation, and claims priority benefit with regard to all common subject matter, of U.S. patent application Ser. No. 11/538,867, filed Oct. 5, 2006, and entitled "SYSTEM AND METHOD OF SECURE ENCRYPTION FOR ELECTRONIC DATA TRANSFER," which is now U.S. Pat. No. 8,412,947, issued Apr. 2, 2013. The earlier-filed patents are hereby incorporated by reference in their entirety into the present application.

BACKGROUND

1. Field

Embodiments of the present invention relate to the field of secure data transfer. More particularly, embodiments of the present invention involve a system and method of encoding data and associating the data with an authorized recipient or group of recipients, wherein only an authorized recipient is provided a key for decoding the data.

2. Related Art

Providing secure transfers of encoded data over the Internet and other communications networks has become increasingly important. One method of securing data transfers involves encrypting the transfer data using either symmetric (private key/private key) or asymmetric (public key/private key) architectures. While data encryption can be an effective method of securing data communicated via the Internet, prior art encryption systems suffer from various problems and limitations.

Symmetric encryption uses a single, unique encryption key to encrypt and decrypt each secure data package. However, symmetric encryption requires the sender to communicate the encryption key to the recipient electronically, which can compromise the security of the transaction, or by a non-electronic method, which is too cumbersome for practical use.

Asymmetric encryption, in contrast, requires the use of both a public key and a private key, wherein multiple secure data packages are encrypted using the same public key. This architecture can compromise the security of encrypted data because if an unintended user discovers the private key used to decrypt an encrypted data package, the user will also be able to decrypt all of the data packages encrypted using the public key, which may be a large number of data packages, including previously-sent data packages as well as data packages created in the future.

Furthermore, systems that employ robust asymmetric or symmetric encryption are often difficult for end user's to learn or require users to dedicate a substantial amount of time and effort to encrypting and decrypting each message, resulting in systems that are inefficient for practical use. Such systems also require users to commit to a single, particular mode of data communication or even to a particular software application, whether online or offline, synchronous or asynchronous, web-based or client-based.

Accordingly, there is a need for an improved system of secure data transfer that does not suffer from the problems and limitations of the prior art.

SUMMARY

Embodiments of the present invention provide an improved system of secure data transfer that overcomes the problems and limitations of the prior art. Particularly, embodiments of the present invention provide a system and method of encrypting a data message and associating the message with a recipient or group of recipients, wherein only an authorized recipient is provided a key for decrypting the message.

A first embodiment of the invention is a computer program for enabling a secure data transfer system, wherein at least a portion of the program is stored on a computer-readable medium. The computer program of the first embodiment comprises code segments for enabling a first computer to receive input from a first user identifying transfer data and a recipient identifier, and for enabling the first computer to create an encoding key, encode the transfer data using the key, and communicate the key and the recipient identifier to a second computer.

The computer program of the first embodiment further comprises code segments for enabling the second computer to associate the recipient identifier and the key with a secure package identifier, and to communicate the secure package identifier to the first computer; for enabling a third computer to identify the secure package identifier and the encoded transfer data; for enabling the third computer to receive from a second user a user identifier and to communicate the user identifier and the secure package identifier to the second computer; and for enabling the second computer to communicate the key to the third computer only if the secure package identifier received from the third computer matches the secure package identifier created by the second computer and if the user identifier matches the recipient identifier.

According to a second embodiment of the invention, the computer program enables a first computer to receive transfer data and a plurality of recipient identifiers from a first user and to create an encryption key, encrypt the transfer data, and communicate the key and the recipient identifiers to a second computer. The program enables the second computer to communicate the key and the plurality of recipient identifiers to a third computer, and enables the third computer to associate each of the recipient identifiers with a secure package identifier, and to communicate the secure package identifier to the second computer.

The program further enables the second computer to communicate the secure package identifier to the first computer, and enables the first computer to communicate the secure package identifier and the encrypted transfer data to a fourth computer. The program enables the fourth computer to communicate a user identifier and the secure package identifier to the second computer, enables the second computer to communicate the user identifier and the secure package identifier to the third computer, and enables the third computer to communicate the key to the second computer only if the secure package identifier received from the second computer matches the secure package identifier created by the third computer and if the user identifier received from the third computer matches one of the plurality of recipient identifiers associated with the secure package identifier. The program enables the second computer to communicate the key to the fourth computer.

In a third embodiment of the invention is a computer program with various code segments for enabling a secure data transfer system. A first code segment enables a first computer to receive from a first user transfer data, sender identification information, sender authentication information, and recipient identification information, to create an encryption key, to encrypt the transfer data using the encryption key, and to communicate the sender identification information, sender authentication information, recipient identification information, and key to a second computer.

A second code segment enables the second computer to authenticate the first user by verifying that the sender identification information and sender authentication information match identification and authentication information stored in a database, to generate a recipient anonymous indicator corresponding to the recipient identification information and communicate the recipient anonymous indicator and the key to a third computer only if the first user is authenticated.

A third code segment enables the third computer to create a secure package identifier and to associate the recipient anonymous indicator and the key with the secure package identifier, and to communicate the secure package identifier to the second computer. A fourth code segment enables the second computer to communicate the secure package identifier to the first computer, and a fifth code segment enables the first computer to communicate the secure package identifier and the encrypted transfer data to a fourth computer. A sixth code segment enables the fourth computer to receive user identification and authentication information from a second user, to communicate the secure package identifier, the user identification and authentication information to a fifth computer.

A seventh code segment enables the fifth computer to create a user anonymous indicator corresponding to the user identification information, and to communicate the user anonymous identifier and the secure package identifier to the third computer. An eighth code segment enables the third computer to match the secure package identifier received from the fifth computer with the secure package identifier created by the third computer, to compare the user anonymous identifier with the recipient anonymous identifier associated with the secure package identifier, and to communicate the key to the fifth computer only if the secure package identifier received from the fifth computer is the same as the secure package identifier created by the third computer and the user anonymous identifier is the same as the first recipient anonymous identifier associated with the secure package identifier.

A ninth code segment enables the fifth computer to communicate the key to the fourth computer, and a tenth code segment enables the fourth computer to decrypt the encrypted transfer data using the key.

A fourth embodiment of the invention is a method of secure data transfer. The method comprises using a first computer to receive from a first user transfer data and a recipient identifier, using the first computer to creating an encoding key, encode the transfer data using the key, and communicate the key and the recipient identifier to a second computer, and using the second computer to associate the recipient identifier with a secure package identifier, and to communicate the secure package identifier to the first computer.

The secure package identifier and the encoded transfer data are transferred to a third computer, and the third computer is used to receive from a second user a user identifier and to communicate the user identifier and the secure package identifier to the second computer. The second computer is used to communicate the key to the third computer only if the secure package identifier received from the third computer matches the secure package identifier created by the second computer and if the user identifier matches the recipient identifier.

According to a fifth embodiment of the invention, the method comprises communicating sender identification and authentication information, an encryption key, and a list of recipient identifiers from a first client computer to a first server computer, and authenticating the sender at the first server computer by comparing the sender authentication information to authentication information stored in a database. Each of the recipient identifiers is encoded using the first server computer, and the encoded recipient identifiers and the key are communicated to a second server computer. A secure package identifier is created at the key server, and the secure package identifier is associated with the key and the encoded recipient identifiers. The secure package identifier is communicated from the second server computer to the first server computer, and from the first server computer to the first client computer.

The transfer data is encrypted at the first client computer and the encrypted transfer data and the secure package identifier are transferred from the first client computer to a second client computer. The secure package identifier, a user identifier pertaining to a second user, and user authentication information pertaining to the second user, are communicated from the second client computer to a third server computer. The second user is authenticated at the third server computer by comparing the user authentication information to authentication information stored in a database.

The user identifier is encoded at the third server computer, and the encoded user identifier and the key are communicated to the second server computer. The secure package identifier received from the third server computer is matched with the secure package identifier created by the second server computer, and the key is communicated from the second server computer to the third server computer only if the encoded user identifier matches one of the encoded recipient identifiers received from the second server computer. The key is communicated from the second third server computer to the second client computer.

In a sixth embodiment, the invention is computer program for enabling a secure data transfer system, at least a portion of the program being stored on a computer-readable medium. The computer program comprises a code segment for enabling a first computer to receive an encoding key and a recipient identifier from a second computer, to associate the recipient identifier and the key with a secure package identifier, and to communicate the secure package identifier to the second computer. The computer program of the sixth embodiment further comprises a code segment for enabling the first computer to receive a user identifier and a secure package identifier from a third computer, and to communicate the key to the third computer only if the secure package identifier received from the third computer matches the secure package identifier created by the second computer and if the user identifier matches the recipient identifier associated with the secure package identifier.

In a seventh embodiment, a first code segment enables a first computer to receive an encoding key, sender authentication information, and a recipient identifier from a second computer, and to communicate the recipient identifier and the key to a third computer only if the sender authentication information matches authentication information stored in a database. A second code segment enables the third computer to create a first secure package identifier and associate the key and the recipient identifier with the first secure package identifier, and to communicate the first secure package identifier to the first computer.

A third code segment enables the first computer to communicate the first secure package identifier to the second computer, and a fourth code segment enables the first computer to receive a user identifier, user authentication information, and a second secure package identifier from a fourth computer, and to communicate the second secure package identifier and the user identifier to the third computer only if the user authentication information matches authentication information stored in the database.

A fifth code segment enables the third computer to communicate the key to the first computer only if the second secure package identifier matches the first secure package identifier and if the user identifier received from the first computer matches the recipient identifier associated with the secure package identifier. A sixth code segment enables the first computer to communicate the key to the fourth computer.

These and other important aspects of the present invention are described more fully in the detailed description below.

BRIEF DESCRIPTION OF THE DRAWINGS

An embodiment of the present invention is described in detail below with reference to the attached drawing figures, wherein:

FIG. 3 is a flow diagram of exemplary steps performed by the sender client of FIG. 2;

FIG. 4 is a flow diagram of exemplary steps performed by the recipient client of FIG. 2;

DETAILED DESCRIPTION

Figure 1:
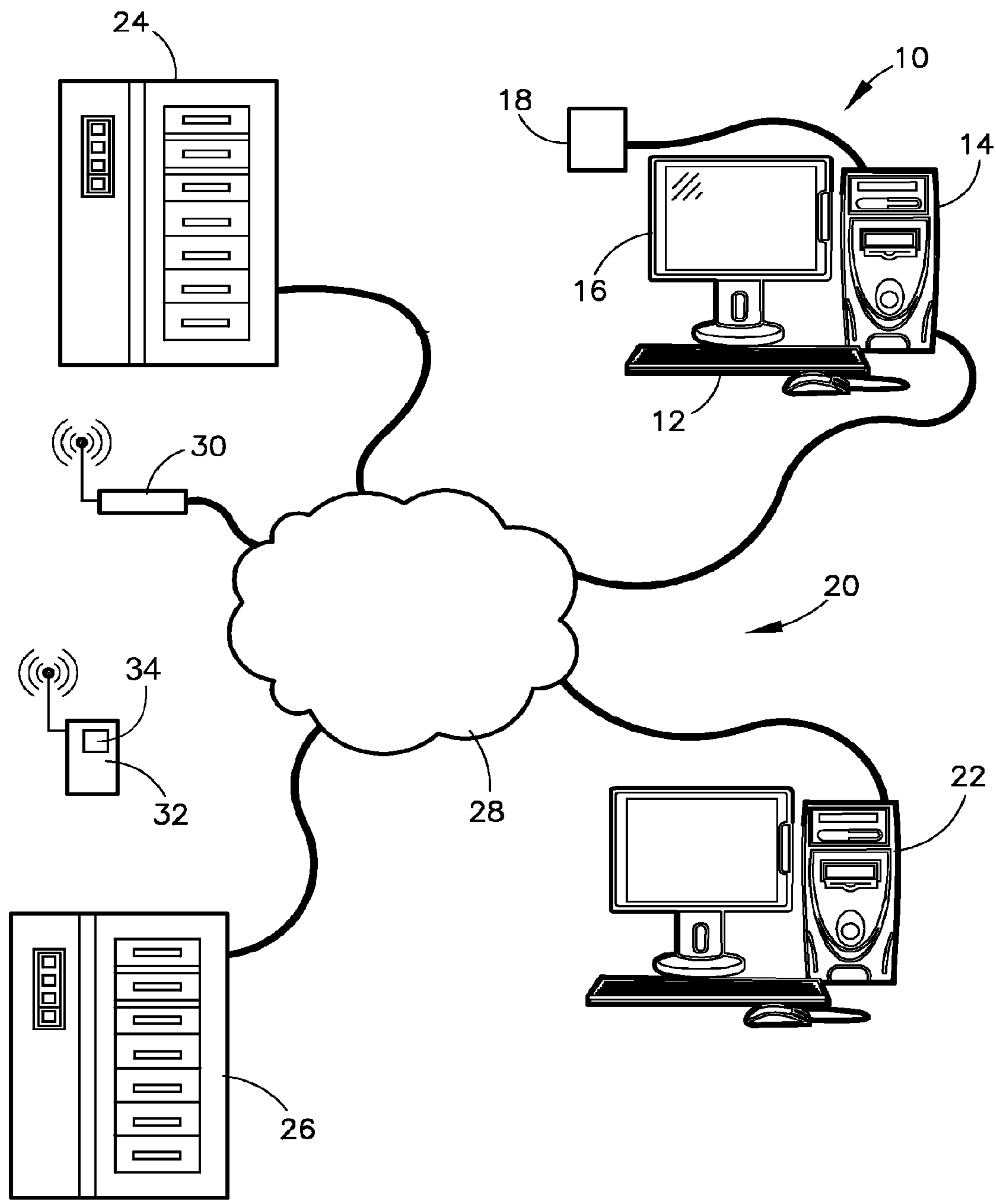
FIG. 1 is an exemplary computer network operable to implement a computer program embodying principles of the present invention.

FIG. 1 illustrates an exemplary computer network operable to implement a computer program incorporating principles of the present invention. The present invention relates to a system and method of encoding data and associating the encoded data with an authorized recipient or group of recipients, wherein only an authorized recipient is provided a key for decrypting the message, and wherein both the sender and the recipient must submit valid authentication information, such as biometric information, before accessing the system.

The method of the present invention is especially well-suited for implementation on a computer or computer network, such as the computer 10 illustrated in FIG. 1 that includes a keyboard 12, a processor console 14, a display 16, and one or more peripheral devices 18, such as a biometric sensor, scanner, or printer. The computer 10 is preferably part of a computer network, such as the computer network 20 that includes one or more client computers 10,22 and one or more server computers 24,26 interconnected via a communications system 28. The present invention may also be implemented, in whole or in part, on a wireless communications system including, for example, a network-based wireless transmitter 30 and one or more wireless receiving devices, such as a hand-held computing device 32 with wireless communication capabilities. The device 32 includes an input element 34, such as a biometric sensor, touchscreen, or a keypad.

The present invention will thus be generally described herein as a computer program. It will be appreciated, however, that the principles of the present invention are useful independently of a particular implementation, and that one or more of the steps described herein may be implemented without the assistance of a computing device.

The present invention can be implemented in hardware, software, firmware, or a combination thereof. In a preferred embodiment, however, the invention is implemented with a computer program. The computer program and equipment described herein are merely examples of a program and equipment that may be used to implement the present invention and may be replaced with other software and computer equipment without departing from the scope of the present invention.

The computer program of the present invention is stored in or on a computer-usable medium, such as a computer-readable medium, residing on or accessible by a plurality of host computers for instructing the host computers to implement the method of the present invention as described herein. The host computers preferably include one or more server computers, such as server computer 24, and two or more network client computers, such as computer 10. Portions of the program of the present invention preferably run on each of the different computers, as explained below. The computer program preferably comprises an ordered listing of executable instructions for implementing logical functions in the host computers and other computing devices coupled with the host computers. The computer program can be embodied in any computer-usable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by those skilled in the art that the program may comprise a single list of executable instructions or two or more separate lists, and may be stored on a single computer-usable medium or multiple distinct media. The program will also be described as comprising various "code segments," which may include one or more lists, or portions of lists, of executable instructions. Code segments may include overlapping lists of executable instructions, that is, a first code segment may include instruction lists A and B, and a second code segment may include instruction lists Band C.

In the context of this application, a "computer-usable medium" can be any means that can contain, store, communicate, propagate or transport the program for use by or in connection with the instruction execution system, apparatus, or device. The computer-usable medium can be, for example, but is not limited to, an electronic, magnetic, optical, electromagnetic, infrared, or semi-conductor system, apparatus, device, or propagation medium. More specific, although not inclusive, examples of computer-usable media would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-usable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 5:
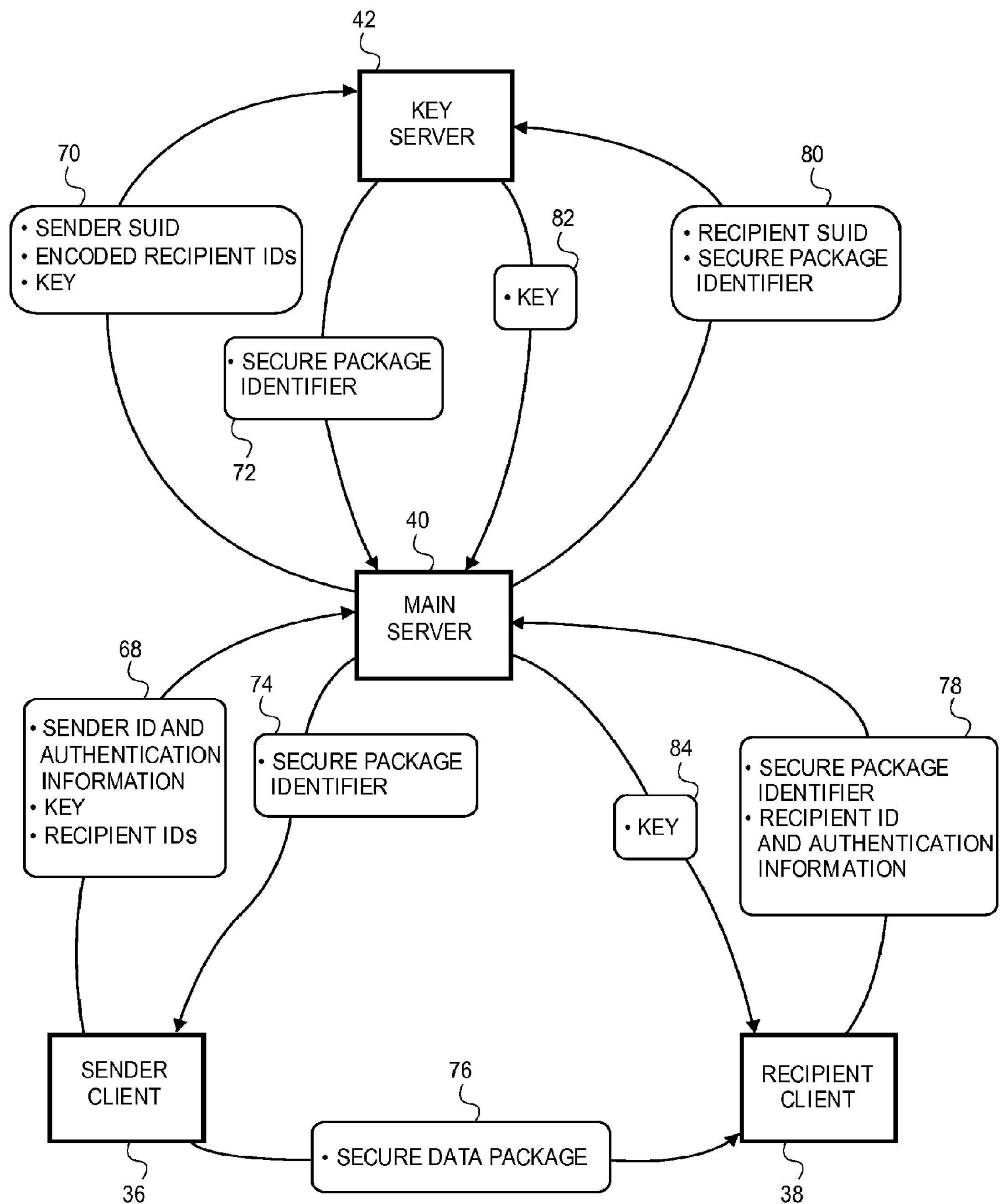
FIG. 5 is a diagram illustrating an exemplary protocol executed by the software components of FIG. 2.

The flow charts of FIGS. 3 and 4 and the diagram of FIG. 5 illustrate the functionality and operation of various elements of an implementation of the present invention in more detail. In this regard, some of the blocks of the flow charts may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

Figure 2:
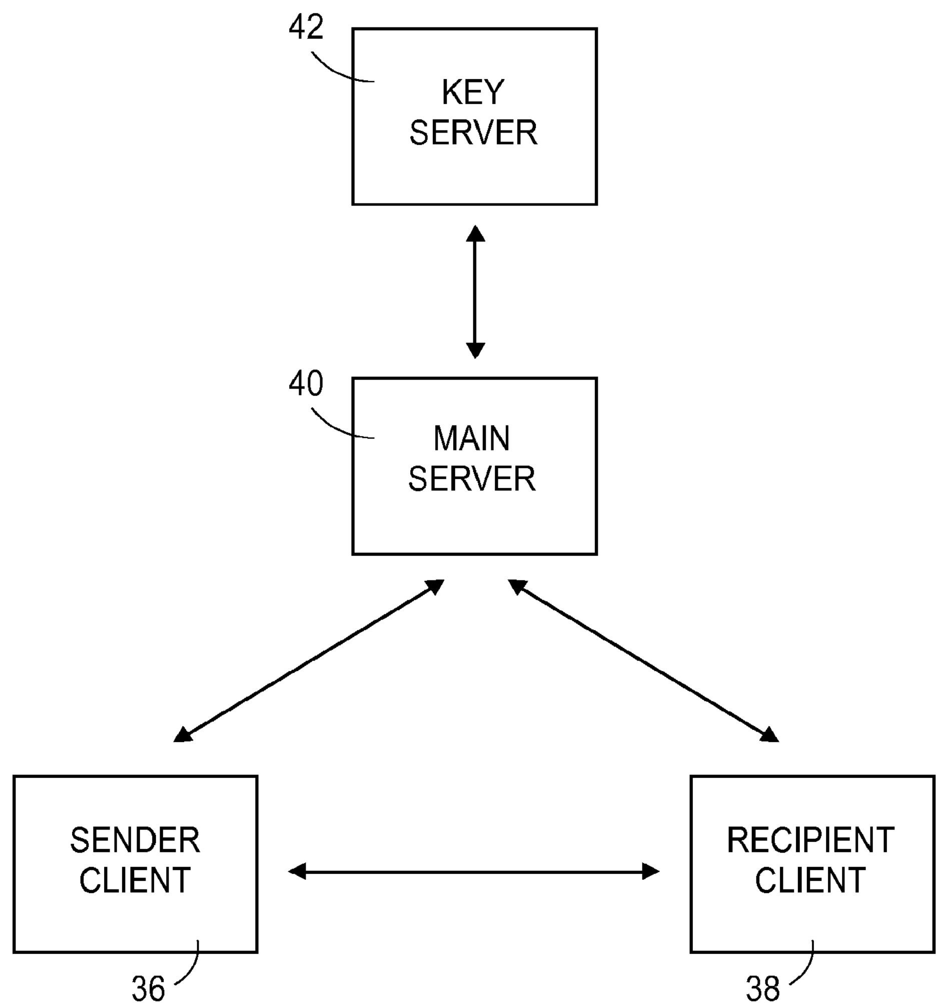
FIG. 2 is a block diagram illustrating an exemplary architecture of the computer program of FIG. 1, wherein the architecture comprises various software components including a sender client, a recipient client, a main server, and a key server.

FIG. 2 illustrates an architecture of a first embodiment of the present invention as implemented on the computer network of FIG. 1. The embodiment illustrated in FIG. 2 broadly comprises the interaction of four separate software modules including a sender client 36, a recipient client 38, a main server 40, and a key server 42. The sender client 36 and the recipient client 38 are separate software applications running on separate computers. However, the sender client 36 and the recipient client 38 are identical, or substantially identical, and therefor each is operable to send as well as receive transfer data. In other words, the sender client 36 is operable to function as a recipient client when receiving a secure data package, and the recipient client 38 is operable to act as a sender client when sending a secure data package. Therefore, when reference is made herein to the "client," the "clients," the "sender client 36," or the "recipient client 38," it will be understood that such reference applies to both the sender client 36 and the recipient client 38.

The sender client 36 of FIG. 2 may run on the computer 10 of FIG. 1 and the recipient client 38 of FIG. 2 may run on the computer 22 of FIG. 1, or vice versa. Alternatively, one of the sender client 36 or the recipient client 38 may run on the wireless handheld device 32, wherein a user may submit biometric information via a biometric sensor 34 integral with or attached to the device 32. Furthermore, the main server 40 may correspond to the server 24, and the key server 42 may correspond to the server 26, or vice versa.

FIG. 3 illustrates various steps performed by the sender client 36 and FIG. 4 illustrates various steps performed by the recipient client 38. FIGS. 3 and 4 illustrated various general steps performed by the clients, while particular embodiments of the sender client 36 and the recipient client 38 will be described below in greater detail.

With particular reference to FIG. 3, the sender client 36 receives identification and authentication information from a sender, as depicted in block 44. The identification information may include a user name, an email address, or both and the authentication information may include a password, biometric information, or both. Biometric information is communicated to the sender client 36 by a user in a conventional manner, such as via a biometric sensor 18 associated with the computer 10 or a biometric sensor 34 associated with the wireless hand-held device 32. The biometric information may include, but is not limited to, fingerprint data, voice print data, retinal scan data, iris scan data, facial characteristics, and behavioral characteristics, such as signature data, captured and analyzed using conventional hardware and processes known in the art. Furthermore, the biometric data used by the claimed invention may be any combination of one or more types of such biometric data.

The sender client 36 generates a key as depicted in block 46. The key is used to encode and decode transfer data, as explained below in greater detail. Such encoding may take the form of encryption, steganography, or both. For purposes of simplicity, the encoding will be referred to herein as encryption, and the key will be referred to as an encryption key. The sender client 36 generates a unique encryption key for each transaction, thereby reducing the risk of compromising the contents of a large volume of encrypted data.

As used herein, transfer data refers to data communicated from one computer to another, such as from the sender client 36 to the recipient client 38. Transfer data may thus be any type of data including, for example, text, graphics, computer code, or files associated with any type of computer application.

The sender client 36 assembles a list of recipients as, depicted in block 48. The list includes identification information corresponding to each recipient, such as an email address, recipient name, or other recipient identifier such as a social security number, anonymous number, or any combination thereof. The sender client 36 may assemble list of recipients substantially automatically by, for example, reading the contents of a "TO" field of an email application. Alternatively, the sender client 36 may prompt a user to submit a number of recipients to include in the list, such as where the user selects a list of recipients from a list or directly types each recipient into a data field. The "list" of recipients may include any number of recipients, including as few as one recipient or a very large number of recipients.

The sender client 36 communicates the sender identification information, sender authentication information, encryption key, and list of recipients to the main server 40, as depicted in block 50. The sender client 36 receives a secure package identifier from the main server 40, as depicted in block 52. As explained below in greater detail, the main server 40 may generate the secure package identifier, or may work in cooperation with the key server 42 to generate the secure package identifier. The secure package identifier is an alphanumeric value that uniquely identifies the transfer data the sender client 36 communicates to the recipient client 38.

The sender client 36 encodes the transfer data using the encryption key, as depicted in block 54. The sender client 36 uses a symmetrical encryption scheme such that a single, unique key is associated with each secure data package and the key used by the sender client 36 to encrypt the transfer data is also the key used by the recipient client 38 to decrypt the data. As explained below in greater detail, the main server 40 and/or the key server 42 regulate the distribution of the encryption key to eliminate or reduce the risk of an unauthorized person obtaining the encryption key.

The sender client 36 combines the encrypted transfer data and the secure package identifier to form the secure data package, as depicted in block 56. Thus the secure data package includes not only the encrypted transfer data but also the secure package identifier, which is used by the recipient client 38 to request the encryption key from the main server 40.

With reference now to FIG. 4, the recipient client 38 receives identification information and authentication information from the recipient, as depicted in block 58. This step is substantially the same as step 44, described above, wherein the sender client 36 receives identification and authentication information from the sender. The recipient client 38 identifies the secure package identifier in the secure data package, as depicted in block 60. Because the secure package identifier is not encrypted with the transfer data, the recipient client 38 can read and remove the secure package identifier without decrypting the transfer data. This may be done, for example, by placing the secure package identifier in a heading of the secure data package.

The recipient client 38 communicates the identification information, the authentication information, and the secure package identifier to the main server 40, as depicted in block 62. The main server verifies the recipient identification information and authentication information, and uses the secure package identifier to obtain and communicate the correct encryption key to the recipient client 38. Thus, the recipient client 38 receives the encryption key from the main server 40, as depicted in block 64. Finally, the recipient client 38 decrypts the encrypted transfer data using the encryption key, as depicted in block 66. It is possible that a user interacting with the recipient client 38 is not a valid recipient of the secure data package, in which case the main server 40 or the key server 42 prevents the user from receiving the key.

The sender client 36 may encrypt the sender identification and authentication information, the key, and the list of recipients in layers before communicating these to the main server 40. For example, the sender client 36 may first combine the sender identification and authentication information to form a first bundle and encrypt the first bundle, then combine the encrypted first bundle with the key to form a second bundle and encrypt the second bundle, and then combine the encrypted second bundle with the list to form a third bundle and encrypt the third bundle. Likewise, the recipient client 38 is operable to decrypt these items in the layers they were encrypted in.

As explained above, both the sender client 36 and the recipient client 38 are each operable to function as a sender client and as a recipient client. Thus, the sender client 36 executes the steps illustrated in FIG. 3 when used to create and send a secure data package, and executes the steps illustrated in FIG. 4 when used to receive and decrypt a secure data package. Likewise, the recipient client 38 executes the steps illustrated in FIG. 3 when used to create and send a secure data package, and executes the steps illustrated in FIG. 4 when used to receive and decrypt a secure data package.

Referring again to FIG. 2, the main server 40 communicates with the key server 42, the sender client 36, and the recipient client 38. The main server 40 retains authentication records and performs authentication in a conventional manner. Authentication may include, for example, comparing a user name and a password received from a user with a user name and a password stored in an authentication database to verify the identity of the user submitting the user name and password. The main server 40 may also maintain a biometric authentication database, wherein the main server 40 compares biometric information, such as fingerprint data, with biometric information stored in the database.

Figure 8:
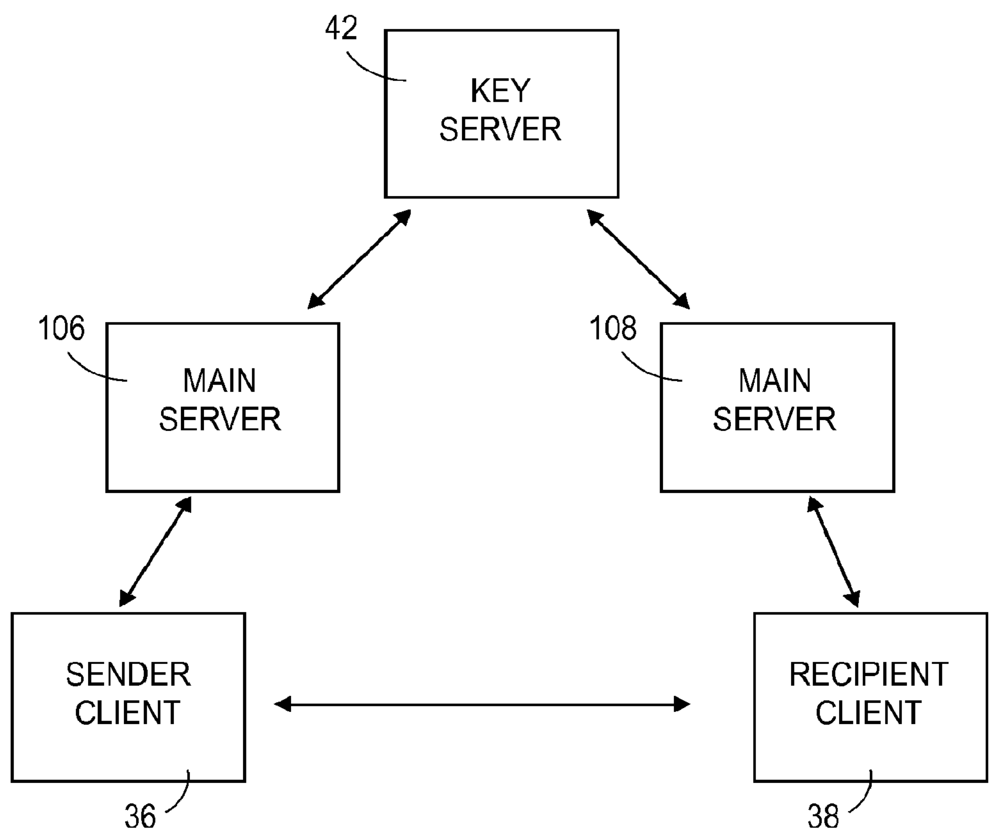
FIG. 8 is a diagram illustrating a first alternative architecture of the computer program of FIG. 1.

The main server 40 communicates with the key server 42 to enable the key server 42 to create a secure package identifier and associate the secure package identifier with a secure data package. The main server 40 further requests verification of each recipient requesting an encryption key. The main server 40 is further operable to perform an encoding algorithm on each recipient identifier included in the list of recipients submitted by a sender via the sender client 36. In one embodiment, the encoding algorithm involves hashing each recipient identifier to generate a number corresponding to the recipient identifier. Such encoding enables the present invention to hide the actual name and other sensitive personal information relating to each user by discarding the information and storing only the encoded identifier. While a single main server 40 is illustrated in FIG. 2, it will be appreciated by those skilled in the art that a plurality of main servers may be employed in the present invention wherein the sender client 36 uses a first main server and the recipient client 38 uses a second main server. This alternative configuration is illustrated in FIG. 8 and described in greater detail below.

The key server 42 stores secure data package identification records wherein each record associates a secure package identifier with a list of recipients, a key, an encryption record, and other information. The key server 42 also regulates the disbursement of encryption keys stored thereon. More specifically, the key server 42 receives a secure package identifier and a recipient identifier from the main sever 40, confirms the recipient identifier is associated with the secure package identifier in a secure data package identification record, and communicates the encryption key to the main server 40 only if the recipient identifier matches a recipient identifier associated with the secure package identifier. This process is described in greater detail below.

It should be noted from FIG. 2, that the key server 42 communicates only with the main server 40, and does not communicate directly with the sender client 36 or the recipient client 38. This configuration enables the key server 42 to work with a plurality of main servers 40 and provides an extra layer of security.

FIG. 5 illustrates an exemplary protocol for implementing the present invention in the sender client 36, the recipient client 38, the main server 40 and the key server 42. The operations performed by the sender client 36 and the recipient 38 are illustrated in FIG. 3 and FIG. 4 respectively, and were described above. Therefore, the steps taken by the sender client 36 and the recipient 38 will not be discussed in detail here.

The first interaction between the computers illustrated in FIG. 2 occurs when the sender client 36 communicates sender identification information, sender authentication information, an encryption key, and a list of recipient identifiers to the main server 40, as depicted in box 68. The main server 40 creates a server/user identifier (SUID), which is a combination of the user identifier and an identifier of the main server 40. The main server 40 also encodes each recipient identifier received from the sender client 36, as explained above. A preferred method of encoding the recipient identifiers involves hashing the identifiers to generate a unique numeric hash value corresponding to each recipient identifier. The encoding scheme preferably generates a unique encoded value for each recipient identifier; therefore, the recipient identifiers received from the sender client 36 can be discarded and replaced with the anonymous encoded recipient identifiers, thus preserving the privacy and anonymity of the recipients. The main server 40 or the key server 42 may obtain the original recipient identifier corresponding to an encoded value by performing the hashing algorithm in reverse.

Figure 6:
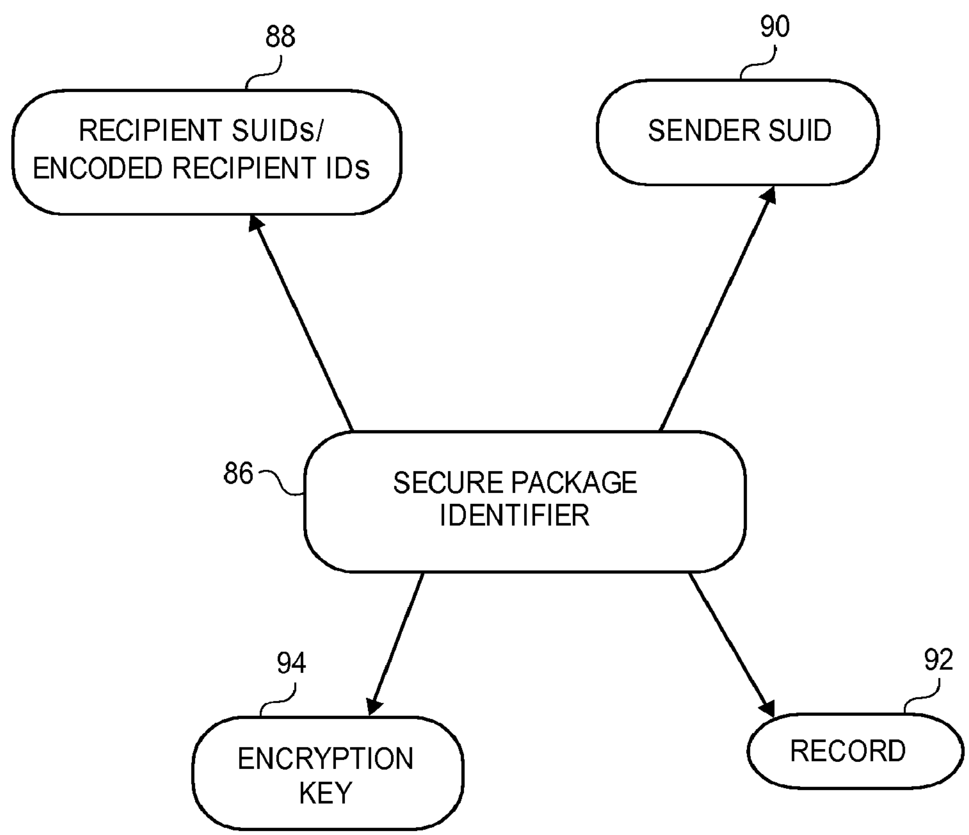
FIG. 6 is a diagram illustrating an exemplary data structure created and maintained by the key server of FIG. 2, wherein the data structure links a secure package identifier with various attributes of a corresponding secure data package.

The second communication that occurs in the protocol illustrated in FIG. 5 occurs when the main server 40 communicates the sender SUID, the encoded (anonymous) recipient identifiers, and the key, to the key server 42, as illustrated in box 70. Referring to FIG. 6, the key server 42 creates a secure package identifier 86 and a transaction record 92, and associates the secure package identifier 86 with the sender SUID 90, the encoded recipient identifiers 88, the key 94, and the transaction record 92. The key server 42 updates the transaction record 92 each time the key server 42 communicates the key 94 to the main server 40 in response to a request from the main server 40. Thus, the record 92 indicates to which recipient of the list of recipients 88 the encryption key 94 was communicated. This may be advantageous, for example, for billing records.

Figure 7:
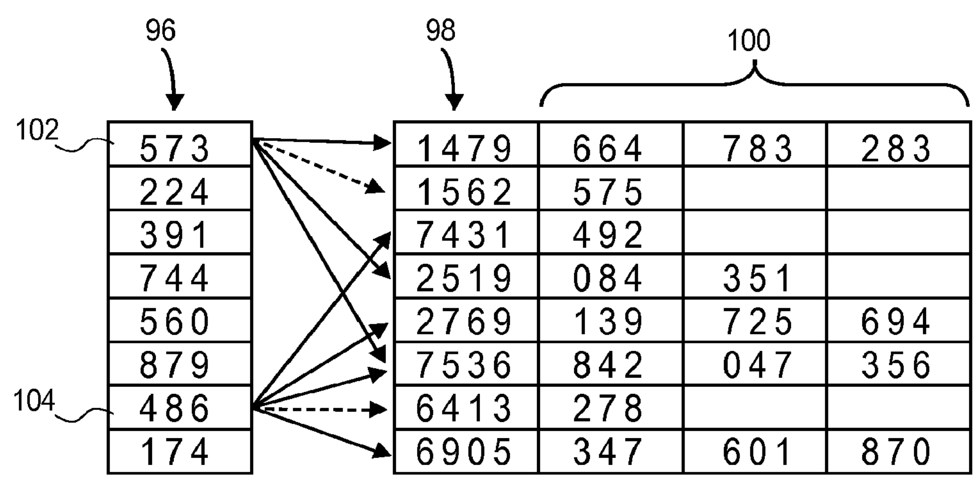
FIG. 7 is a diagram illustrating in more detail a portion of the data structure of FIG. 6.

FIG. 7 illustrates a specific implementation of a portion of the data structure of FIG. 6. Various secure package identifiers are stored in a column 96 of a table of FIG. 7, including secure package identifiers 102 and 104. A second column 98 includes a plurality of SUIDs associated with each of a plurality of recipients. A plurality of additional columns 100 include encoded recipient identifiers each associated with a recipient SUID of the column 98. For example, in the top row of the table of FIG. 7, the secure package identifier 102 is the number "573." The dotted line extending from secure package identifier 102 to the second row of the table indicates the sender SUID corresponding to number "1562" is the sender of the transfer data associated with the secure package identifier 102. Furthermore, the encryption package identifier in cell number 102 is linked to three separate recipient identifiers, as illustrated by the three solid-line arrows. In this case, the secure package identifier 102 is associated with the recipient SUID corresponding to the number "1479," to the recipient SUID corresponding to the number "2519," and to the recipient SUID corresponding to number "7536."

Each of the recipient SUIDs corresponding to the secure package identifier 102 includes a plurality of encoded recipient identifiers. Thus, when the key server 42 receives any of the encoded recipient identifiers corresponding to one of the recipient SUIDs linked to the encryption package identifier 102, the key server 42 can confirm that the recipient associated with the encoded recipient identifier is a valid recipient of the key 94. There may be multiple recipient identifiers associated with a single recipient, where, for example, a user has multiple email addresses such as a work address and a home address. In that case, whether the recipient is requesting the key 94 from a work email account or a home email account, the key server 42 will recognize the encoded recipient identifier received from the user via the main server 40 as pertaining to the recipient SUID.

It should be noted that in FIG. 7 the column 98 includes multiple SUIDs and does not distinguish between a sender SUID and a recipient SUID. In a first secure data package identification record, an SUID may correspond to the sender, while in a second secure data package identification record, the same SUID may correspond to one of the recipients.

Once the key server 42 creates the secure package identifier 86 and associates the secure package identifier 86 with the encoded recipient identifiers 88, the sender SUID 90, the key 94, and the record 92, the key server 42 communicates the secure package identifier 86 to the main server 40 as depicted in box 72 of FIG. 5. The main server 40 then communicates the secure package identifier 86 to the sender client 36 as depicted in box 74. At this point, the sender client 36 has everything it needs to create the secure data package, which includes the secure package identifier 86 and encrypted transfer data.

The sender client 36 creates the secure data package by using the key 94 to encrypt the transfer data. The encrypted transfer data is then associated with the secure package identifier 86 to create the secure data package. As explained above, the secure package identifier 86 is not encrypted along with the transfer data, but rather is bundled with the encrypted transfer data such that the recipient client 38 is able to read the secure package identifier 86 without the key 94. Once the sender client 36 creates the secure data package, the secure data package is transferred to the recipient client 38, as depicted box 76. This transaction occurs in a manner that is substantially conventional. For example, the sender client 36 may communicate the secure data package to the recipient client 38 via conventional email communication channels, as an email attachment or in the body of an email text.

It should be noted that the particular manner of communicating the encryption package from the sender client 36 to the recipient client 38 is not important to the present invention, and that the secure data package need not be transferred to the recipient client 38 via electronic means at all. Once the sender client 36 creates the secure data package, a user may store the secure data package on a physical data medium such as, for example, a compact disc or a portable hard drive, and physically carry the storage medium to the recipient client 38. Furthermore, the sender client 36 may or may not include a code segment for transferring the secure data package to the recipient client 38. The sender client 36 may create the secure data package, for example, and place the secure data package into an email as text or as an attachment, wherein a conventional email application provides the computer code for transferring the secure data package to the host computer of the recipient client 38. Furthermore, the recipient client 38 may not receive the secure data package immediately upon arrival of the package at the recipient client's host computer, but may enable a user to submit information identifying the secure data package, wherein the recipient client 38 processes the package.

When the recipient client 38 receives the secure data package, the recipient client 38 identifies the secure package identifier 86 and prompts the recipient to submit identification and authentication information. The recipient client 38 may prompt the user to submit the identification and authentication information in a substantially conventional manner by presenting, for example, one or more pop up windows with text fields for receiving a user name and a password, or for receiving a user name and biometric information. When the recipient client 38 has identified the secure package identifier 86 and has received the recipient identification and authentication information, the recipient client 38 communicates the secure package identifier 86 and the recipient identification and authentication information to the main server 40, as depicted in box 78. The main server 40 then creates a recipient SUID that identifies both the requesting recipient as well as the main server 40. In this case, the server identifier associated with the sender SUID will be the same as the server identifier associated with the recipient SUID, because both the sender and the recipient are using the same main server 40. It will be appreciated, however, that if the sender client 36 uses a first main server and the recipient client 38 uses a second main server (see FIG. 8), the server portion of the sender SUID will be different than the server portion of the recipient SUID.

The main server 40 communicates the secure package identifier 86 and the recipient SUID to the key server 42. The key server 42 determines whether the secure package identifier received from the main server 40 matches a secure package identifier in column 96 of the data structure illustrated in FIG. 7. If so, the key server 42 compares the recipient SUID received from the main server 40 with each of the SUIDs in column 98 that are associated with the secure package identifier received from the main server 40. If the secure package identifier received from the main server 40 is linked to an SUID that matches the recipient SUID received from the main server 40, the key server 42 communicates the key 94 to the main server 40, as depicted in box 82. The main server 40 then communicates the key 94 to the recipient client 38, as depicted in box 84. The recipient client 38 uses the encryption key 94 to decrypt the encrypted transfer data that it received in the secure data package.

The present invention thus uses various layers of security to protect data that is transferred from the sender client 36 to the recipient client 38. First, the sender client 36 encrypts the data using a single encryption key and the recipient client 38 decrypts the data using the same encryption key in a symmetrical encryption architecture. Use of the symmetrical encryption scheme reduces the necessity to make available a public key associated with each of various secure transactions. Thus, if a third party happens to obtain an encryption key associated with a secure data package, the third party will not be able to use the key to access unrelated secure data packages. Second, the sender client 36 requires the sender to submit not only sender identification information but also sender authentication information in the form of a password or biometric information to verify the sender's identity. Third, the recipient client 38 requires the recipient to submit identification information and authentication information in the form of a password or biometric information to verify the sender's identity.

While the protocol of FIG. 5 has been illustrated and described as using a single main server 40 it will be understood that a plurality of main servers may be used instead of a single main server. This is illustrated in FIG. 8, wherein the sender client 36 communicates with a first main server 106 and the recipient client 38 communicates with a second main server 108 and wherein both main servers 106, 108 communicate with the key server 42. The embodiment illustrated in FIG. 8 may be desirable where, for example, the sender client 36 and recipient client 38 are at geographically remote physical locations and therefore must communicate with different main servers.

In the embodiment shown in FIG. 8, the protocol illustrated in FIG. 5 is substantially similar although the operations performed by the main server in FIG. 5 are divided up between the first main server 106 and the second main server 108 in FIG. 8. For example, the first main server 106 of FIG. 8 receives the sender identifier and the sender authentication information, the encryption key and the list of recipient identifiers from the sender client 36, encodes the recipient identifiers, and creates the sender SUID, and communicates the sender SUID, the encoded recipient identifiers and the encryption key to the key server 42. The key server 42 then communicates the encryption package identifier 86 to the first main server 106, which communicates the encryption package identifier to the sender client 36.

Likewise the recipient client 38 communicates the encryption package identifier and the recipient identification information and the recipient authentication information to the second main server 108. The second main server 108 creates the recipient SUID and communicates the recipient SUID and the encryption package identifier to the key server 42. The key server 42 communicates the encryption key 94 to the second main server 108 which communicates the encryption key to the recipient client 38.

Figure 9:
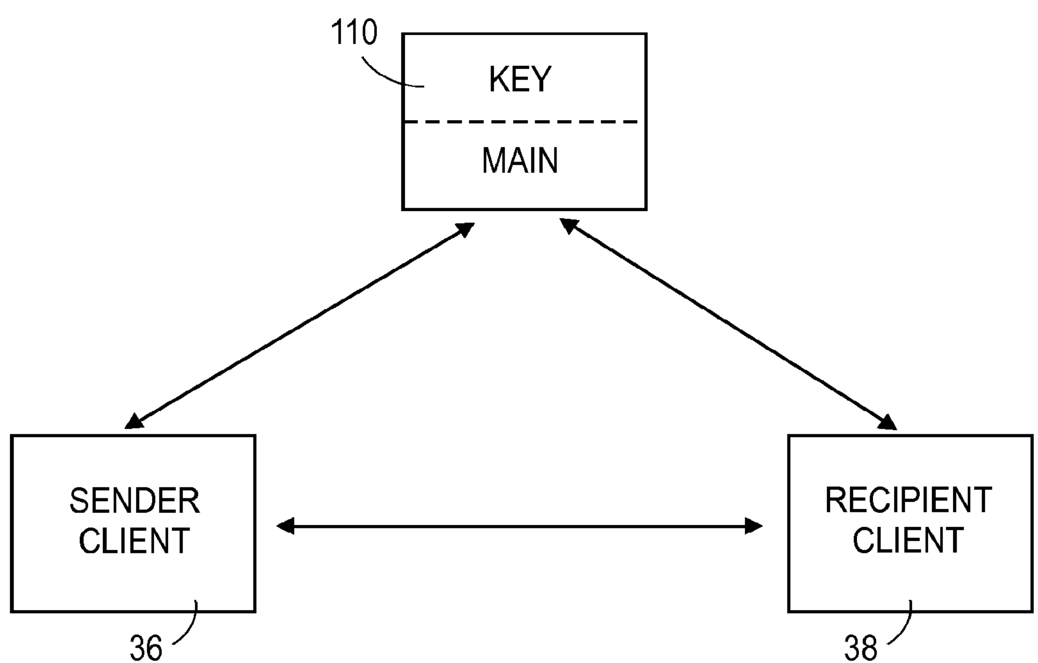
FIG. 9 is a diagram illustrating a second alternative architecture of the computer program of FIG. 1.

In yet another embodiment illustrated in FIG. 9, a single server 110 performs the functions and operations of the main server 40 and the key server 42 illustrated in FIG. 5 and described above. While the embodiment illustrated in FIG. 9 is not preferable, the server 110 performs the same functions as the main server 40 and the key server 42 of FIG. 5 and therefore is functionally equivalent. The embodiment illustrated in FIG. 9 may be preferable, for example, where the heightened security associated with separate main and key servers is not necessary.

In each of the above embodiments, security may be enhanced by maintaining the key only in the key server 42 (or equivalent) and not retaining a copy of the key in any of the other computers. When the sender client 36 creates and communicates the key to the main server 40, for example, the sender client 36 destroys or discards the key upon communicating the key to the main server 40. In other words, the sender client 36 communicates the key to the main server 40 and then removes any indication or record of the key from memory and storage associated with the sender client 36. Likewise, the main server 40 destroys the key upon communicating the key to the key server 42, and then again upon communicating the key to the recipient client 38. The recipient client 38 also destroys the key after using the key to decrypt the encrypted transfer data. While maintaining the key only on the key server 42 enhances security in some situations, it is not necessary and the present invention may be otherwise implemented.

As explained above, each of the sender client 36 and the recipient client 38 may be presented in one of four embodiments. In a first embodiment, the client software is a "plugin" associated with a traditional email application such as MICROSOFT OUTLOOK™ or LOTUS NOTES™. These are but two examples, and those skilled in the art will recognize that any conventional or known email or other messaging application may be used including, for example, instant messaging.

Figure 10:
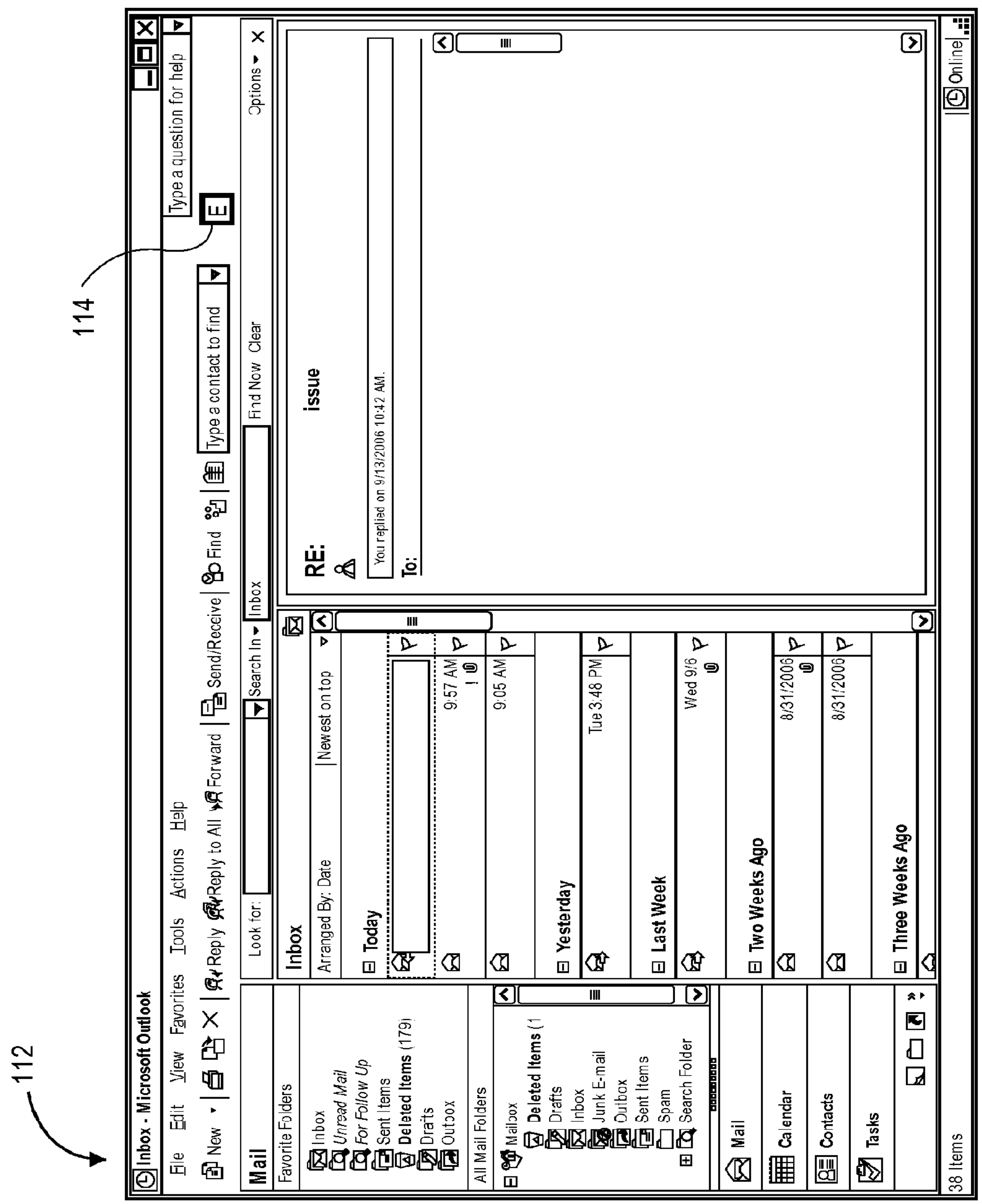
FIG. 10 illustrates a user interface of a conventional email application presenting an interface element corresponding to either the sender client or the recipient client of FIG. 2.

FIG. 10 illustrates a user interface 112 of a conventional email application, in this case MICROSOFT OUTLOOK™. The user interface 112 is substantially conventional except that the interface 112 includes an interface element 114 associated with the client 36. To use the client 36 with the interface 112, the user composes a new email message in a conventional manner and, before sending the email message, selects the user interface element 114 associated with the client 36. When the user selects the interface element 114 the client prompts the user to submit a user name as well as authentication information. This may be done, for example, by presenting a pop-up window with text fields for a user name and a password, or a text field for a user name and a button for requesting submission of biometric information. Such a pop-up window may be similar to window 122 of FIG. 13.

The client 36 then generates the encryption key and assembles the list of recipients. In this case, the client 36 may assemble the list of recipients simply by reading recipient information from the "TO" field of the newly composed email message. The client 36 communicates the sender identification and authentication information, the key, and the list of recipient identifiers to the main server 40, and receives the encryption package identifier 86 from the main server 40. When the client 36 receives the secure package identifier 86 it encrypts the data in the body of the email and displays the encrypted text in the body of the email instead of the plain text. The client 36 then places the secure package identifier 86 in the email, such as in the title of the email message or in another location where it can be easily retrieved by the recipient client 38. The user then sends the email message in a convention manner to the intended recipient or list of recipients.

When the recipient client 38 receives the email message with the secure data package, the email message will appear in a conventional email application interface such as that of FIG. 10. The difference will be that the body of the text will appear in encrypted form, and the email application interface will present an interface element 114 associated with the recipient client 38. When the recipient attempts to open the email message, the recipient client 38 prompts the recipient to submit user identification and authentication information, as explained above in relation to the sender client 36. The recipient client 38 identifies the encryption package identifier 86 in the secure data package and communicates both the secure package identifier 86 and the user identification and authentication information to the main server 40. The recipient client 38 receives the key 94 from the main server 40, and decrypts the encrypted transfer data. When the recipient client 38 decrypts the encrypted transfer data, the decrypted (plain text) data will appear in the body of the email in a conventional manner.

In a second embodiment, the sender client 36 and recipient client 38 are not plugins associated with a preexisting email application, but rather are stand alone applications. In the second embodiment, the client 36 is operable to work with a native data buffer to use onscreen text or other data to encrypt the data in preparation for creating an encryption package. An example of the second embodiment of the client 36 is illustrated in FIGS. 11-14.

Figure 11:
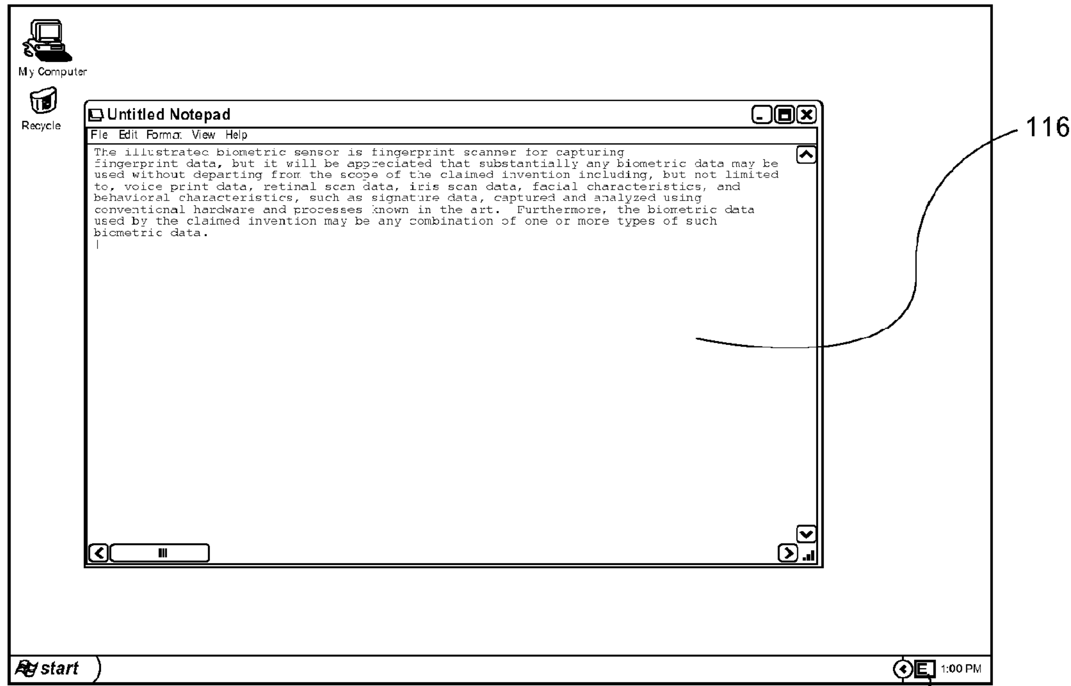
FIG. 11 is an interface of a conventional computing environment presenting a window with a text field and an icon corresponding to either the sender client or the recipient client of FIG. 2.
Figure 12:
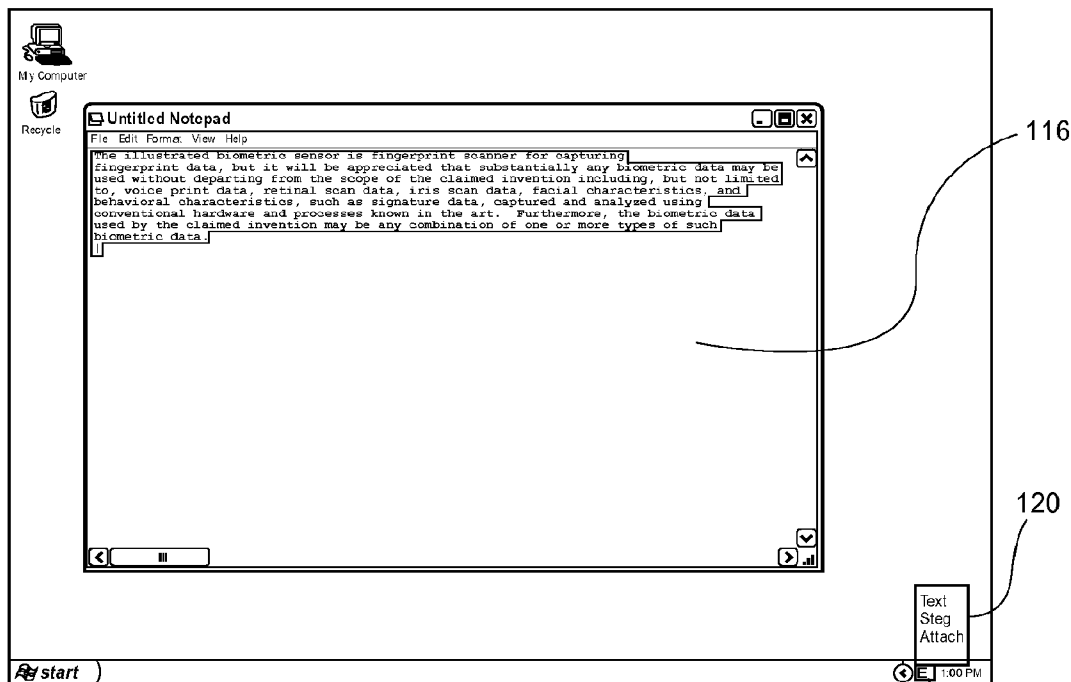
FIG. 12 is the user interface of FIG. 11 illustrating highlighted text in the text field and presenting a context menu associated with the icon.

FIG. 11 illustrates a conventional computing environment wherein a text processor such as MICROSOFT NOTEPAD™ is visible in the computing environment, such as the desktop of the MICROSOFT WINDOWS™ operating system. While the illustrated window 116 is a word processor, it will be appreciated that substantially any application that is compatible with the host operating environment and operable to transfer data to the data buffer may be used with the second embodiment of the client 36. As illustrated in FIG. 12, the user selects or highlights the portion of the data that he or she wishes to encode. In the window 116 of FIG. 12 the entire body of text is highlighted. The user then selects the user interface element 118 which is, in this case, present in the notification area of the WINDOWS™ task bar. Selecting the interface element 118 causes the client 36 to present a context menu 120. The user selects the text option to enable the client 36 to encode the user-selected text and move it to a buffer as explained below.

Figure 13:
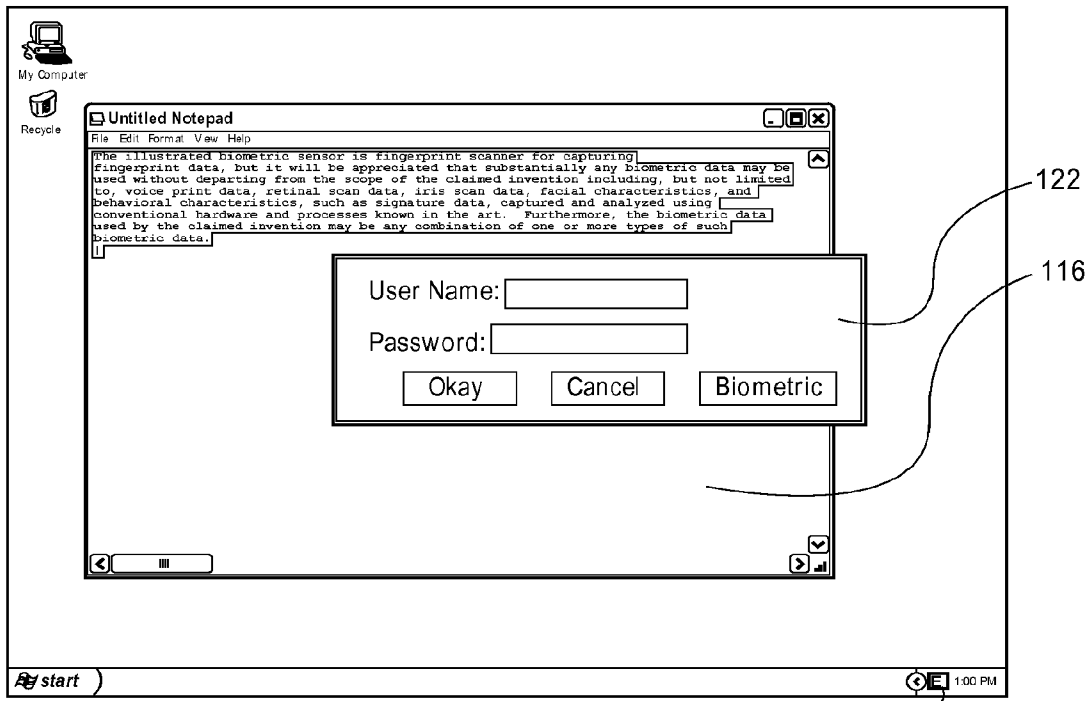
FIG. 13 is the user interface of FIG. 11 presenting a window for prompting a user to submit identification and authentication information.
Figure 14:
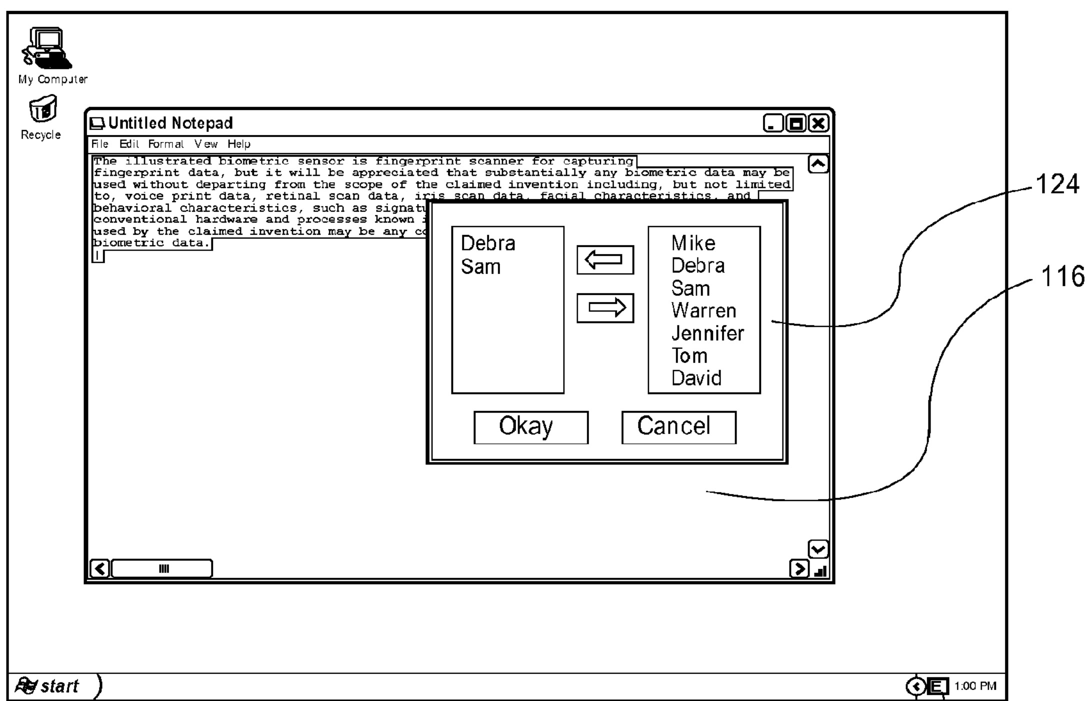
FIG. 14 is the user interface of FIG. 12 presenting a window for enabling a user to select one or more recipients of transfer data.

When the user selects the text option of the context menu 120, the client 36 prompts the user to move the highlighted text to the buffer by "cutting" the highlighted text. In this case, the buffer is the WINDOWS™ clipboard and the cutting operation is performed by the user in a conventional manner, such as, for example, selecting the hot key combination CTRL+X on the keyboard. Cutting the highlighted text in the window 116 removes the text from the window 116 and places it in the data buffer. When the text is placed in the buffer, the client 36 prompts the user to submit identification and authentication information with a dialog box 122, as illustrated in FIG. 13. Wherein the user submits a user name, password and/or biometric information, the client 36 prompts the user to submit recipient information via a second dialog box 124, as illustrated in FIG. 14. When the user has submitted the recipient information, the program creates an encryption key. The sender client 36 communicates the sender identification authentication information, the encryption key and the list of recipient identifiers to the main server 40, as explained above.

When the sender client 36 receives the secure package identifier 86 from the main server 40, the client 36 encrypts the data that is in the buffer (the transfer data) using the key and creates a secure data package by associating the secure package identifier with the encrypted transfer data. The client 36 then prompts the user to move the secure data package from the buffer to an application, such as the application from which the original transfer data was removed. Placing the encryption package in the application may involve, for example, selecting the "paste" option in the windows operating environment. The secure data package may then be communicated to the host computer of the recipient client 38 by, for example, storing the secure data package in a data file and attaching the data file to an email, by pasting the secure data package directly into the body of an email or of a text message, or by saving the secure data package to a file on a removeable data storage medium and physically transporting the data storage medium to the recipient client 38.

Once the recipient client 38 identifies the encryption package, it goes through a process similar to that described above for the plugin embodiment of the client to decrypt the transfer data in the secure data package. The user moves the secure data package, which in this case includes text, to the data buffer of the host computing environment by highlighting the encrypted text and selecting "copy" option in the windows operating environment. The client 38 prompts the user to submit authentication information in substantially the same way that the sender client 36 prompted the user to submit the authentication information. When the recipient is authenticated, the client 38 decrypts the data using the key it received from the main server 40, and when the decryption is complete the program launches a viewer window into which the decrypted text is placed. The decrypted data also remains in the data buffer for the user to place in another application if so desired.

Figure 15:
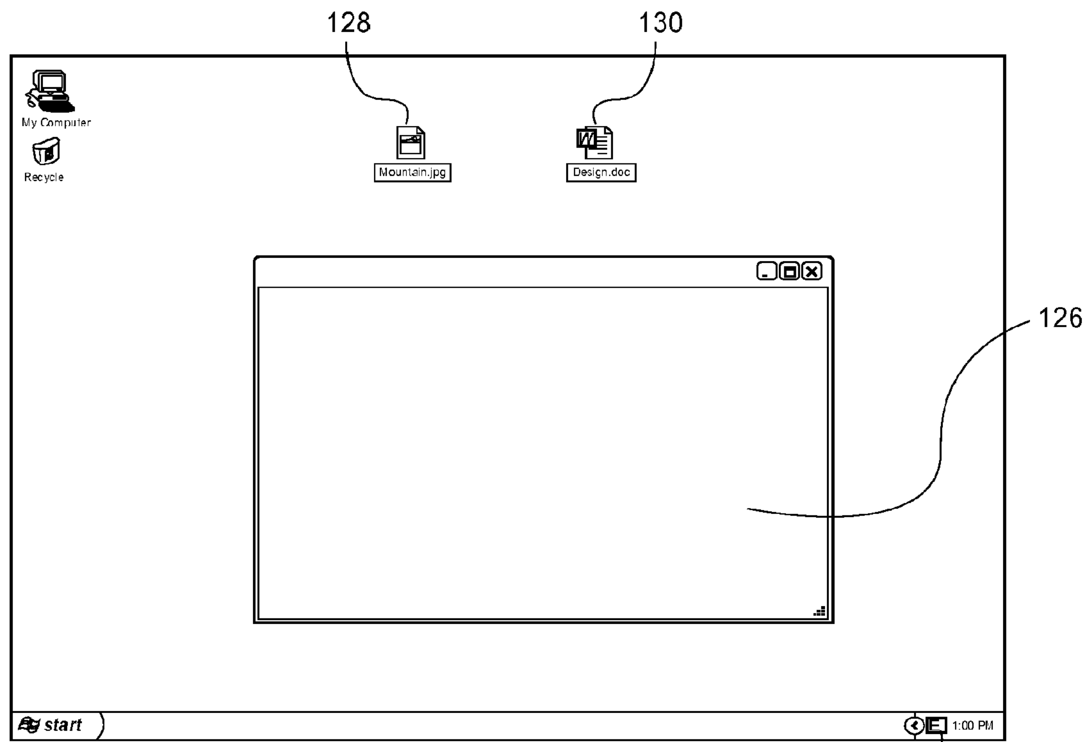
FIG. 15 illustrates a user interface of a conventional computing environment illustrating a third embodiment of the sender client and recipient client of FIG. 2 wherein the environment presents a canvas for receiving an image file and a data transfer file and wherein the environment presents an icon pertaining to the sender client or recipient client of FIG. 2.
Figure 16:
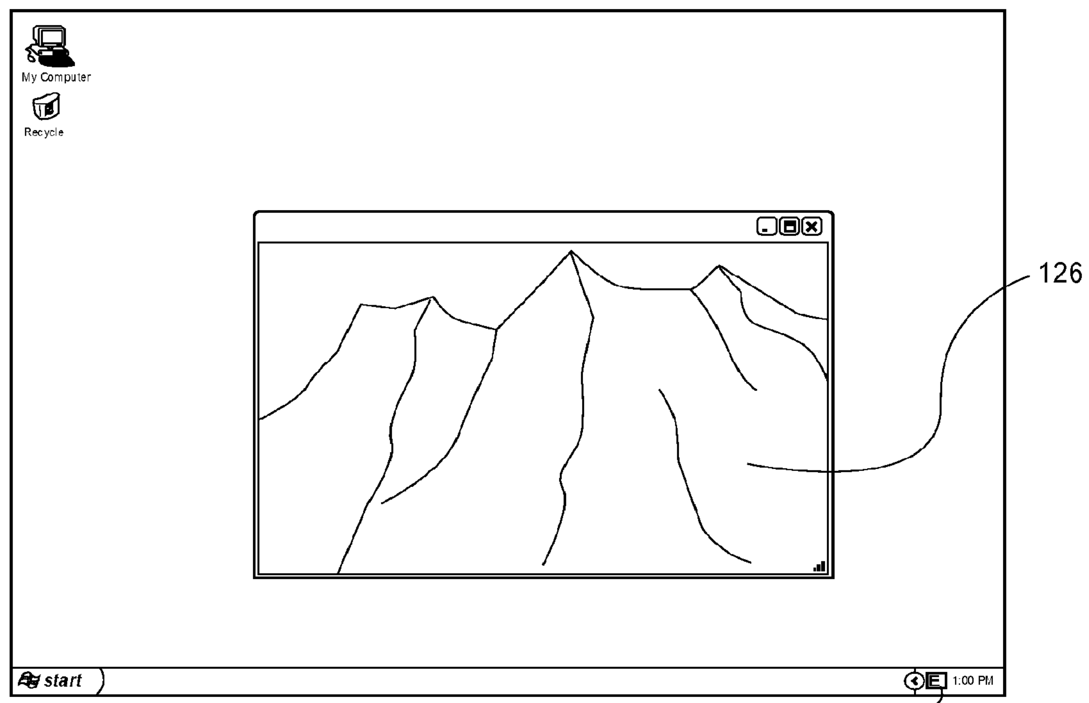
FIG. 16 is the user interface of FIG. 15 illustrating the image file and the data transfer file placed within the canvas such that the image file is visible within the canvas.

In a third embodiment the client 36 encodes the transfer data by merging the transfer data with a separate file using conventional steganography techniques. This embodiment of the client 36 is illustrated in FIGS. 15 and 16. As illustrated in FIG. 15, a conventional computing environment presents a canvas 126, a user interface element 118 associated with a sender client 36, an image file 128, and a transfer data file 130. The transfer data file 130 is encoded or encrypted in the separate image file 128 (in this case, an image file) when both the transfer data file 130 and the separate image file 128 are placed in the canvas 126. For example, the user first selects the separate data file 128 and places it in the canvas 126 using a conventional drag-and-drop or cut-and-paste operation.

The user then places the transfer data file 130 into the canvas in the same way. The program prompts the user to submit identification and authentication information, creates an encryption key, prompts the user to submit recipient identification information and communicates with the main server in the manner described above. When the client 36 receives the encryption package identifier 86 from the main server 40, the sender client 36 then completes the encryption package by associating the encryption package identifier 86 with the image carrying the encrypted transfer data 130. The client 36 then prompts the user to save the newly-created secure data package as a separate file. When the recipient client 38 identifies the secure data package, it presents a canvas similar to the canvas 126 of FIGS. 15-16, and prompts the recipient to place the file containing the encoded data package into the canvas or, alternatively, automatically places the file into the canvas. The client 38 then prompts the recipient to submit authentication and identification information, as explained above, and goes through the process depicted in the flowchart of FIG. 4.

In a fourth embodiment, the client 36 enables the user to indicate an existing data file by, for example, selecting the file in MICROSOFT WINDOWS EXPLORER™ or a similar utility, and selecting the "Attach" option of the context menu 120 (see FIG. 12). The client 36 presents an interface similar to the canvas 126 of FIG. 15, and prompts the sender to place the file in the interface or automatically places the file in the interface. The client 36 then goes through the steps of FIG. 3, described above, and creates a secured data package including data contained in the user-selected file. The client 36 then prompts the user to save the secured data package as a new file, wherein the user can transfer the secured data package to the recipient client 38 electronically, such as via email, or in another manner, including physically transferring a storage medium containing the secured data package.

Although the invention has been described with reference to the preferred embodiments illustrated in the attached drawings, it is noted that equivalents may be employed and substitutions made herein without departing from the scope of the invention as recited in the claims. It will be appreciated, for example, that email is not the only means of electronically communicating a secured data package from the sender client 36 to the recipient client 38, and that other forms of electronic communication may be used including the hyper-text transfer protocol (HTTP) and the file transfer protocol (FTP).

Having thus described a preferred embodiment of the invention, what is claimed as new and desired to be protected by Letters Patent includes the following:

1. A non-transitory computer-readable storage medium with an executable program stored thereon for enabling a secure data transfer transaction between a sender and a recipient, wherein the program instructs at least one hardware processor to perform the following steps:

enabling receiving, by a computer associated with the sender, transfer data and a recipient identifier for the data transfer transaction;

enabling generating, by the computer associated with the sender, a key for encoding and decoding the transfer data, wherein the key is unique for the data transfer transaction;

enabling encoding of the transfer data using the key;

enabling communicating, by the computer associated with the sender and to an authentication server, the key and the recipient identifier;

enabling communicating, by the computer associated with the sender and to a computer associated with the recipient, the encoded transfer data;

enabling communicating, by the authentication server and to the computer associated with the recipient, the key; and enabling decoding, by the computer associated with the recipient, the encoded transfer data using the key to obtain said transfer data.

2. The computer-readable storage medium of claim 1, wherein the recipient identifier is an email address associated with the recipient.

3. The computer-readable storage medium of claim 1, wherein the step of encoding the transfer data using the key is performed by the computer associated with the sender.

4. The computer-readable storage medium of claim 1, wherein the computer associated with the sender is a client computer controlled by the sender, and the computer associated with the recipient is a client computer controlled by the recipient.

5. The computer-readable storage medium of claim 1, wherein the computer associated with the sender is a server accessible by a client computer controlled by the sender, and the computer associated with the recipient is a server accessible by a client computer controlled by the recipient.

6. The computer-readable storage medium of claim 1, wherein the computer associated with the sender is either or both of a client computer controlled by the sender and a server accessible by the client computer controlled by the sender, and the computer associated with the recipient is either or both of a client computer controlled by the recipient and a server accessible by the client computer controlled by the recipient.

7. The computer-readable storage medium of claim 1, further comprising:

enabling receiving, by the computer associated with the recipient, live recipient authentication information from the recipient and communicating the live recipient authentication information to the authentication server;

enabling comparing, by the authentication server, the live recipient authentication information received from the computer associated with the recipient, with stored recipient authentication information previously stored in a database accessible by the authentication server; and enabling communicating, by the authentication server and to the computer associated with the recipient, the key, but only if the live recipient authentication information received from the computer associated with the recipient matches the stored recipient authentication information stored in the database.

8. A method for enabling a secure data transfer transaction between a sender and a recipient, comprising the steps of:

enabling receiving, by a computer associated with the sender, transfer data and a recipient identifier for the data transfer transaction;

enabling generating, by the computer associated with the sender, a key for encoding and decoding the transfer data, wherein the key is unique for the data transfer transaction;

enabling encoding of the transfer data using the key;

enabling communicating, by the computer associated with the sender and to an authentication server, the key and the recipient identifier;

enabling communicating, by the computer associated with the sender and to a computer associated with the recipient, the encoded transfer data;

enabling communicating, by the authentication server and to the computer associated with the recipient, the key; and enabling decoding, by the computer associated with the recipient, the encoded transfer data using the key to obtain said transfer data.

9. The method of claim 8, wherein the recipient identifier is an email address associated with the recipient.

10. The method of claim 8, wherein the step of encoding the transfer data using the key is performed by the computer associated with the sender.

11. The method of claim 8, wherein the computer associated with the sender is a client computer controlled by the sender, and the computer associated with the recipient is a client computer controlled by the recipient.

12. The method of claim 8, wherein the computer associated with the sender is a server accessible by a client computer controlled by the sender, and the computer associated with the recipient is a server accessible by a client computer controlled by the recipient.

13. The method of claim 8, wherein the computer associated with the sender is either or both of a client computer controlled by the sender and a server accessible by the client computer controlled by the sender, and the computer associated with the recipient is either or both of a client computer controlled by the recipient and a server accessible by the client computer controlled by the recipient.

14. The method of claim 8, further comprising:

enabling receiving, by the computer associated with the recipient, live recipient authentication information from the recipient and communicating the live recipient authentication information to the authentication server;

enabling comparing, by the authentication server, the live recipient authentication information received from the computer associated with the recipient, with stored recipient authentication information previously stored in a database accessible by the authentication server; and enabling communicating, by the authentication server and to the computer associated with the recipient, the key, but only if the live recipient authentication information received from the computer associated with the recipient matches the stored recipient authentication information stored in the database.

15. A system for enabling a secure data transfer transaction between a sender and a recipient, the system comprising:

a sender module including at least one hardware processor programmed to:

obtain transfer data and a recipient identifier for the data transfer transaction, generate a key for encoding and decoding the transfer data, wherein the key is unique for the data transfer transaction, encode the transfer data using the key, communicate the key and the recipient identifier, and communicate the encoded transfer data;

an authentication module including at least one hardware processor programmed to:

receive, from the sender module, the key and the recipient identifier, and communicate the key; and a recipient module including at least one hardware processor programmed to:

receive, from the sender module, the encoded transfer data, receive, from the authentication module, the key, and decode the encoded transfer data using the key to obtain said transfer data.

16. The system of claim 15, wherein the recipient identifier is an email address associated with the recipient.

17. The system of claim 15, said at least one hardware processor of the recipient module further programmed to:

receive live recipient authentication information from the recipient and communicate the live recipient authentication information to the authentication module;

said at least one hardware processor of the authentication module further programmed to:

compare, the live recipient authentication information received from the recipient module with stored recipient authentication information previously stored in a database accessible by the authentication module, and communicate to the recipient module the key, but only if the live recipient authentication information received from the recipient module matches the stored recipient authentication information stored in the database.

18. The system of claim 17, wherein the live recipient authentication information includes biometric information of the recipient.

19. The system of claim 15, wherein the at least one hardware processor of the sender module is further programmed to combine the transfer data with a user-selected data file using the key to perform said encoding of the transfer data.

20. The system of claim 15, wherein the transfer data is created by the sender.

* * * * *